(12) United States Patent
Chang et al.

(10) Patent No.: US 11,907,192 B1
(45) Date of Patent: *Feb. 20, 2024

(54) SYSTEMS AND METHODS FOR ARTIFACT PEERING WITHIN A MULTI-MASTER COLLABORATIVE ENVIRONMENT

(71) Applicant: Palantir Technologies Inc., Denver, CO (US)

(72) Inventors: Allen Chang, Sunnyvale, CA (US); John Carrino, Redwood City, CA (US); David Xiao, San Francisco, CA (US); Timothy Wilson, Palo Alto, CA (US)

(73) Assignee: Palantir Technologies Inc., Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/070,909

(22) Filed: Nov. 29, 2022

Related U.S. Application Data

(63) Continuation of application No. 16/869,451, filed on May 7, 2020, now Pat. No. 11,556,512.

(Continued)

(51) Int. Cl.
*G06F 16/22* (2019.01)
*G06F 16/182* (2019.01)
(Continued)

(52) U.S. Cl.
CPC ............ *G06F 16/2237* (2019.01); *G06F 1/04* (2013.01); *G06F 16/1734* (2019.01); *G06F 16/182* (2019.01); *G06F 16/2322* (2019.01)

(58) Field of Classification Search
None
See application file for complete search history.

(56) References Cited

U.S. PATENT DOCUMENTS

| | | | |
|---|---|---|---|
| 6,098,078 | A | 8/2000 | Gehani et al. |
| 6,615,223 | B1 | 9/2003 | Shih et al. |

(Continued)

OTHER PUBLICATIONS

Holliday, JoAnne, et al. "Epidemic algorithms for replicated databases." IEEE Transactions on Knowledge and Data Engineering 15.5 (2003): 1218-1238. (Year: 2003).*

(Continued)

*Primary Examiner* — Uyen T Le
(74) *Attorney, Agent, or Firm* — Sheppard Mullin Richter & Hampton LLP

(57) ABSTRACT

Systems and methods are provided for master-to-master OT-based artifact peering. A "master-to-master" architecture for artifacts is implemented in a network comprising a plurality of nodes and clients, where no node is designated a "master" or "primary" for a given artifact. A first node receives a subset of remote proposed operations from a second node and determines if a conflict exists between the received subset of remote proposed operations and at least one of a plurality of locally-proposed operations. The first node resolves the conflict based on a total-ordering agreed upon between the first node and the second node. The first node transforms at least one operation, either received or locally-proposed, based on the resolved conflict. The first node than updates a local log to include the transformed operation.

14 Claims, 7 Drawing Sheets

Related U.S. Application Data

(60) Provisional application No. 62/929,718, filed on Nov. 1, 2019.

(51) Int. Cl.
  *G06F 16/23* (2019.01)
  *G06F 16/17* (2019.01)
  *G06F 1/04* (2006.01)

(56) References Cited

U.S. PATENT DOCUMENTS

| | | |
|---|---|---|
| 10,063,660 B1 | 8/2018 | Coldham et al. |
| 11,157,739 B1* | 10/2021 | Iskandar ............... H04W 4/021 |
| 2006/0047713 A1 | 3/2006 | Gornshtein et al. |
| 2006/0190503 A1 | 8/2006 | Naicken et al. |
| 2008/0235444 A1* | 9/2008 | Gower ..................... G11C 5/04 |
| | | 711/105 |
| 2012/0310880 A1 | 12/2012 | Giampaolo et al. |
| 2015/0195220 A1 | 7/2015 | Hawker et al. |
| 2016/0381099 A1 | 12/2016 | Keslin et al. |
| 2018/0011825 A1 | 1/2018 | Levien |
| 2018/0232346 A1 | 8/2018 | Konnola et al. |
| 2019/0266258 A1 | 8/2019 | Chen et al. |
| 2019/0294205 A1 | 9/2019 | Zhao et al. |
| 2019/0340166 A1* | 11/2019 | Raman ................ G06F 16/2255 |
| 2021/0018953 A1 | 1/2021 | Ford |

OTHER PUBLICATIONS

Randolph, Aurel, et al. "On synthesizing a consistent operational transformation approach." IEEE Transactions on Computers 64.4 (2014): 1074-1089. (Year: 2014).*

Holliday, JoAnne, et al. "Epidemic quorums for managing replicated data." Conference Proceedings of the 2000 IEEE International Performance, Computing, and Communications Conference (Cat. No. 00CH37086). IEEE, 2000. (Year: 2000).*

Ellis et al., "Concurrency Control in Groupware Systems", Management of Data, Jun. 1, 1989, pp. 399-407.

Extended European Search Report for EP Application 20205266.8 dated Mar. 31, 2021, 11 pages.

Maanpaa, "A Web Component for Real-Time Collaborative Text Editing", Apr. 30, 2019, pp. 1-104, retrieved from the Internet: URL:https://core.ac uk/download/pdf/199936438.pdf, retrieved Mar. 18, 2021.

Saito et al., "Optimistic Replication", ACM Computing Surveys, Mar. 1, 2005, vol. 37, No. 1, pp. 42-81.

Sun et al., "Achieving Convergence, Causality Preservation, and Intention Preservation in Real-Time Cooperative Editing Systems", ACM Transactions on Computer-Human Interaction, Mar. 1, 1998, vol. 5, No. 1, pp. 63-108.

Non-Final Office Action dated Mar. 31, 2022, issued in related U.S. Appl. No. 16/869,451 (20 pages).

Notice of Allowance dated Sep. 14, 2022, issued in related U.S. Appl. No. 16/869,451 (13 pages).

\* cited by examiner

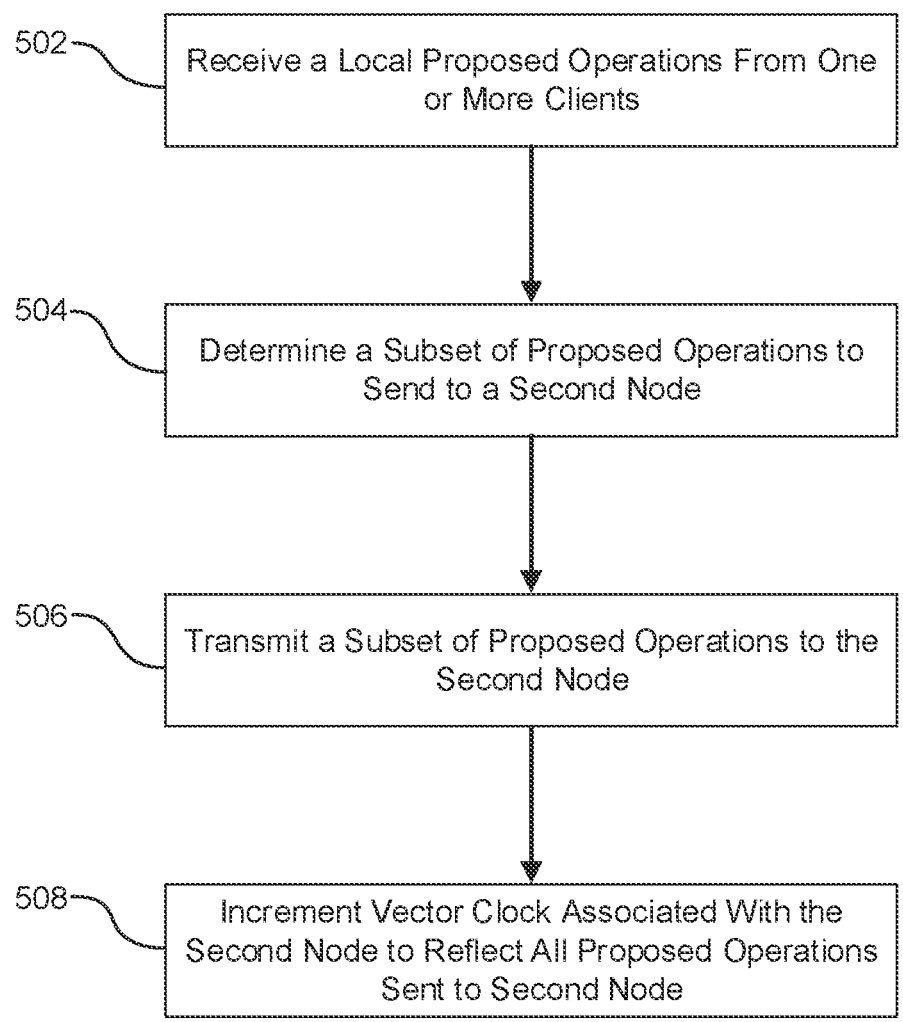

SYSTEMS AND METHODS FOR ARTIFACT PEERING WITHIN A MULTI-MASTER COLLABORATIVE ENVIRONMENT

CROSS REFERENCE TO RELATED APPLICATIONS

This application is a continuation of U.S. application Ser. No. 16/869,451, filed May 7, 2020, which claims the benefit under 35 U.S.C. § 119(e) of U.S. Provisional Application Ser. No. 62/929,718, filed Nov. 1, 2019, the content of which is incorporated by reference in its entirety into the present disclosure.

TECHNICAL FIELD

This disclosure relates to approaches for peering of artifacts between master nodes in a multi-master collaborative environment.

BACKGROUND

Operational transformations (OTs) facilitate concurrent edits for multiple users on a single artifact (e.g., document, map, spreadsheet, etc.). Any change to an artifact is considered an operation (e.g., adding a point to a map, changing the text in a document), and multiple users (e.g., clients) are capable of performing operations concurrently to change the artifact. For example, multiple users can perform operations (e.g., add or modify points) with respect to an artifact (e.g., a map). However, in some cases more than one user may seek to concurrently change the same data object (e.g., the point on a map), resulting in a conflict.

SUMMARY

A claimed solution rooted in computer technology overcomes problems specifically arising in the realm of computer technology. In various implementations, a computing system is configured to provide a collaborative environment in which a number of different nodes act as master nodes for an artifact, allowing each of the different nodes to take changes from each other. If two nodes in the system have received the same set of operations, the solution ensures that the two nodes will agree on the ordering and result in the same final state on both nodes. In this way, each node may be capable of resolving conflicts between operations received from other nodes within the network.

Various embodiments of the present disclose include systems, methods, and non-transitory computer readable media configured to enable a first node to maintain a local vector clock and a copy of a vector clock associated with a second node communicatively coupled to the first node. The first node receives a set of one or more remote proposed operations to an artifact from the second node, as well as receiving locally-proposed operations from one or more clients associated with the first node. The first node is configured to determine a difference between a logical timestamp component of the local vector clock corresponding to the second node and a logical timestamp component of the copy of the vector clock corresponding to the second node. Based on the vector clocks, the first node determines if a conflict exists between the received set of remote proposed operations and at least one locally-proposed operations and, in response to determining a conflict exists, the first node performs an operational transform over the remote proposed operation to account for all locally-proposed operations that happen before the remote proposed operation.

In some embodiments, the first node is configured to increment a logical timestamp associated with the first node for each locally-proposed operation and increment a logical timestamp associated with the second node for each remote proposed operation, wherein the vector clock comprises the logical timestamp of the first node and the logical timestamp of the second node.

In some embodiments, the first node can further add each received one or more remote proposed operations to a shadow log, add each locally-proposed operation to a local log, and, after applying each locally-proposed operation to the local log, adding each locally-proposed operation to the shadow log.

In some embodiments, the operational transform comprises applying an exclusion vector to account for a set of proposed operations determined to happen before a received proposed operation.

In some embodiments, the first node is further configured to, in response to determining a conflict exists, to resolve the conflict based on an agreed upon total ordering defining a desired state of the artifact.

In some embodiments, the first node and the second node each maintain a shadow log representing a true log defining a desired artifact state after all proposed operations are applied.

In some embodiments, the artifact comprises one of a text document, a map, or a spreadsheet.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the technology are utilized, and the accompanying drawings of which:

FIG. 5 depicts a flowchart of an example of a method for performing a first replication mode (e.g., a single-master replication mode) according to some embodiments.

DETAILED DESCRIPTION

Figure 1:
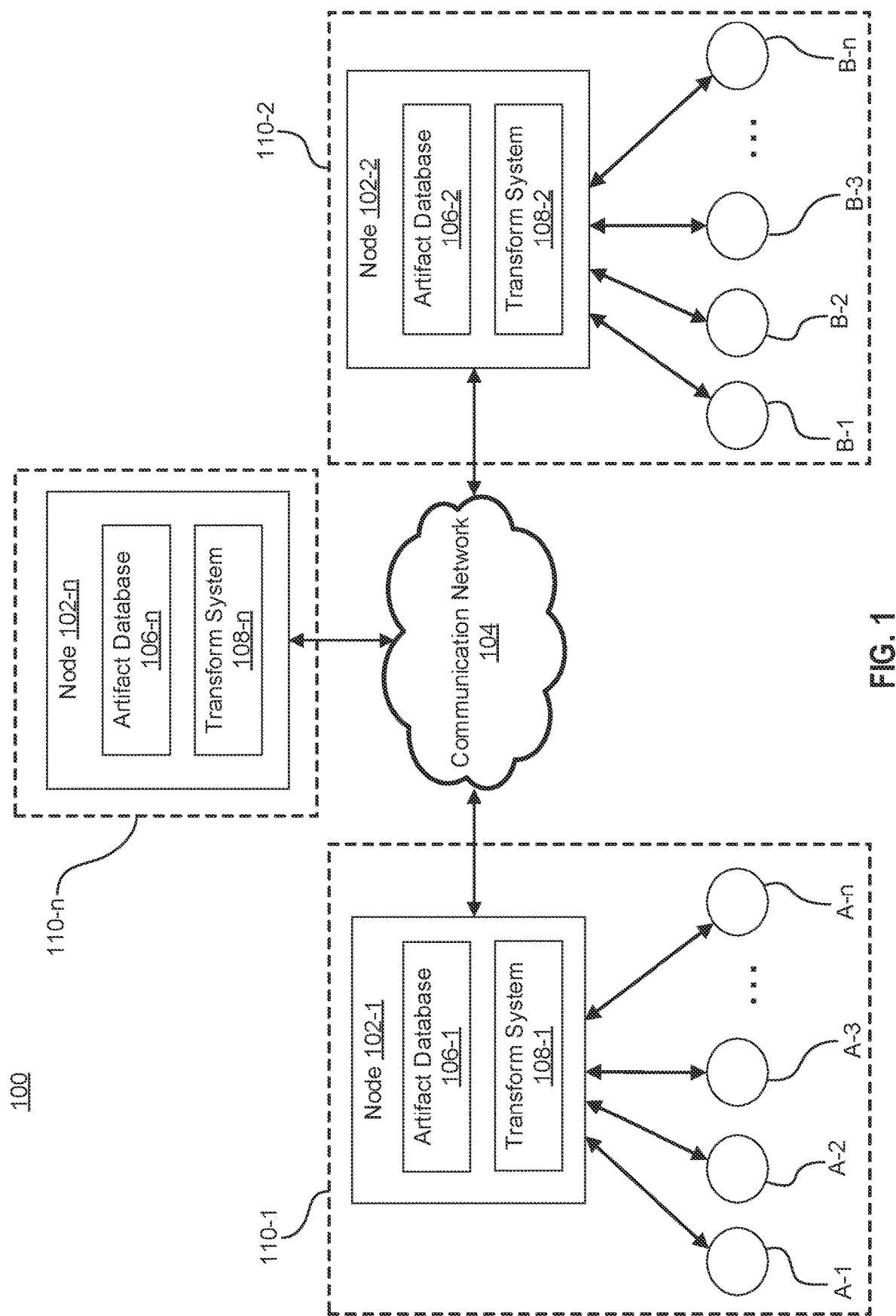
FIG. 1 depicts a diagram of an example of a system for adaptive data replication according to some embodiments.

Operational transformations (OTs) facilitate concurrent edits for multiple users on a single artifact (e.g., document, map, or spreadsheet). In some instances, peering of OT-based artifacts requires a single "primary" (or "master") node to be defined, to act as the arbiter of all conflicts between client nodes (or, simply, "clients") associated with the multiple users. Although client nodes (e.g., non-primary or secondary nodes) can continue to perform operations locally, the master node maintains the master log (or the "true" log of events). The master node sorts the operations it receives in the order it receives them, transforming the operations and sending them back out to the secondary nodes. At the secondary nodes, the transformed operations received from the master node would override the local operations performed by the secondary nodes in the interim. However, requiring a single primary node has a number of technical drawbacks in terms of supporting high availability and/or disconnected operation. For example, the master node may go offline, causing issues with the conflict resolution ability of the system. Moreover, multiple secondary nodes may want to collaborate but which are disconnected from their master mode (e.g., the multiple secondary nodes are offline), resulting in the multiple secondary nodes not being capable of getting the changes into the one true log.

A claimed solution rooted in computer technology overcomes problems specifically arising in the realm of computer technology. In various implementations, a computing system is configured to provide a collaborative environment in which a number of different nodes act as master nodes for an artifact, allowing each of the different nodes to take changes from each other. If two nodes in the system have received the same set of operations, the solution ensures that the two nodes will agree on the ordering and result in the same final state on both nodes. "Master-to-master" artifact peering refers to the ability to peer OT-based artifacts without defining a single "primary" or master node as the arbiter of all conflicts, unlike some collaborative environments that require a single master node for every artifact. By decentralizing the arbitration for conflicts, various implementations provide high-availability, disconnected operation, and support for arbitrary network topologies. Because no single node is the master of a given artifact, if any set of nodes on the network (e.g., mesh network) goes down users are still able to collaborate across the remaining connected nodes.

For example, a network may comprise a number of distinct "stacks." Each stack can comprise a governing node designated to enable a set of clients and/or non-governing nodes connect to other stacks in the network. In a conventional OT system, one or more nodes (e.g., the governing node or a non-governing node) in each stack may be considered the "master" for a given artifact. During normal operation, collaborative activity on that artifact can proceed as intended. However, if for some reason access to the respective master node for an artifact is lost (e.g., the designated "master" goes down, connection to the stack is lost, etc.) the ability for the other users to collaborate on that artifact is impacted. By implementing the claimed solution discussed herein, the ability of users on the still-connected stacks to collaborate on editing the given artifact is maintained. Within each stack, at least one node (e.g., the governing node or a non-governing node) is capable of resolving conflicts between concurrent operations so that, upon performance of the operations accordingly, each stack arrives at the same state for the artifact on its own.

Moreover, edits can occur concurrently when a set of nodes are disconnected from the network (e.g., mesh network), allowing every set of disconnected nodes to independently collaborate. Once the connection with the network is restored, all of the nodes will reconcile their edits to provide a unified view. Finally, in some embodiments, because it is not required that only a single node act as a master for a given artifact, the "master-to-master" architecture puts no requirements on the implemented network topology. For example, the master-to-master architecture for OT-based artifact peering disclosed herein may not require that the network is arranged in a specific network topology, such as but not limited to a star, a hub-and-spoke, etc., nor that a specific number or type of device is present within the system or connected in a specific way. In some embodiments, the "master-to-master" architecture described herein may be referred to as a "masterless" architecture since the architecture does not require a single master for an artifact. Although one or more nodes within the network may be designated to control the operations of clients (e.g., one or more nodes may be considered "masters" for a set of clients and/or secondary nodes), the various embodiments discussed herein enable the masterless architecture (with respect to artifact peering) to be implemented in any implemented network topology.

FIG. 1 depicts a diagram of an example system 100 enabling collaborative updates in accordance with embodiments of the technology disclosed herein. The example system 100 of FIG. 1 is provided for illustrative purposes only and should not be interpreted as limiting the scope of the claimed solution to only the illustrated embodiment. As shown in FIG. 1, the system 100 includes a plurality of stacks 110-1 to 110-n (individually, the stack 110, collectively, the stacks 110), each comprising node 102-1 to 102-n (individually, the node 102, collectively, the nodes 102). In various embodiments, the functionality of the nodes 102 can be performed by one or more servers or other computing devices. The nodes 102 may be geographically distributed across any number of geographic areas, or may be within the same geographic area (e.g., a particular data center). For ease of discussion, the system 100 shall be depicted and described as comprising stacks 110 comprising a single node 102 and a plurality of clients 104 (discussed in greater detail below). Although depicted as such, each stack 110 can comprise a plurality of nodes, with at least one node designated as a governing node for the stack 110. In the illustrated embodiment of FIG. 1 (and discussed with respect to FIGS. 2-8), the node 102 can be considered the designated governing node for its respective stack 110. Nothing in this disclosure should be interpreted as limiting the architecture to having only a single node within each stack 110.

In the example of FIG. 1, the communication network 104 may represent one or more computer networks (e.g., LAN, WAN, or the like) or other transmission mediums. The communication network 104 can provide communication between nodes 102. In some embodiments, the communication network 104 comprises one or more computing devices, routers, cables, buses, and/or other network topologies (e.g., mesh, hub-and-spoke, star, and the like). In some embodiments, the communication network 104 may be wired, wireless, or a combination thereof. In various embodiments, one or more portions of the communication network 104 may comprise an ad hob network, an intranet, an extranet, a virtual private network (VPN), a local area network (LAN), a wide area network (WAN), a metropolitan area network (MAN), the Internet, a public switched telephone network (PSTN), a cellular telephone network, a wireless network, a WiFi network, a WiMAX network, or any other type of wired or wireless network, or a combination of two or more such networks.

Each node 102 can provide server-side functionality to a plurality of associated clients. As depicted in FIG. 1, clients A-1 to A-n are communicatively coupled to node 102-1 and clients B-1 to B-n are communicatively coupled to node 102-2. Other clients (not shown in FIG. 1) may be communicatively coupled to other nodes 102-n within the system 100. The clients may be communicatively coupled to a respective node 102 over a wireless network connection, a wired network connection, or a combination thereof. In some embodiments, the network connection may be of a similar type as that of the communication network 104. Each of the clients may include a client application executing on the client, through which one or more operations to one or more artifacts can be entered. In some embodiments, the client application can be configured to transmit operations to its respective node 102. The client application of each client may include, but is not limited to, a web browser, a messaging application, an email application, a map application, or the like.

Each node 102 is responsible for providing server-side functionality to its connected set of clients. As depicted in FIG. 1, each node 102 may comprise an artifact database 106-1 to 106-n (individually, the artifact database 106, collectively, the artifact databases 106) and a transform system 108-1 to 108-n (individually, the transform system 108, collectively, the transform systems 108). In various embodiments, the artifact databases 106 may comprise one or more non-transitory storage media configured to store a local copy of artifacts within the system 100. Each artifact may refer to a type of data object that can be accessed and worked on in a collaborative manner across the system 100. Non-limiting examples of artifacts include maps, spreadsheets, word processing documents, and the like. In various embodiments, an artifact may comprise a plurality of elements (represented by data structures) that may be impacted by one or more operations entered through the client application. Each node 102 may store a local copy of a shared artifact in its artifact database 106. In various embodiments, the artifacts database 106 may be separate from the node 102 or combined with the node 102.

A transform system 108-1 to 108-n (individually, the transform system 108, collectively, the transform systems 108) of each node 102 can provide a number of functions to accept or reject operations received from its associated clients and/or perform or facilitate OT-based changes to artifacts shared within the system 100. In various embodiments, the transform system 108 can comprise one or more modules, engines, or applications and each of which may be embodied in hardware, software, firmware, circuitry, or any combination thereof.

Any of the systems or machines shown in FIG. 1 may be, include, or otherwise be implemented in a special-purpose (e.g., specialized or otherwise non-generic) computer that has been modified (e.g., configured or programmed by software, such as one or more software modules or an application, operating system, firmware, middleware, or other program) to perform one or more of the functions described herein for that system or machine. For example, a special-purpose computer system able to implement any one or more of the methodologies described herein as discussed with respect to FIGS. 5 and 6, and such a special-purpose computer may accordingly be a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines (e.g., databases, devices, servers, etc.).

As used herein, a "database" is a data storage resource and may store data structures as a text file, a stable, a spreadsheet, a relational database (e.g., an object-relational database), a triple store, a hierarchical data store, or any suitable combination thereof. Moreover, any two or more of the systems or machines illustrated in FIG. 1 may be combined into a single system or machine, and the functions described herein for any single system or machine may be subdivided among multiple systems or machines.

Figure 2:
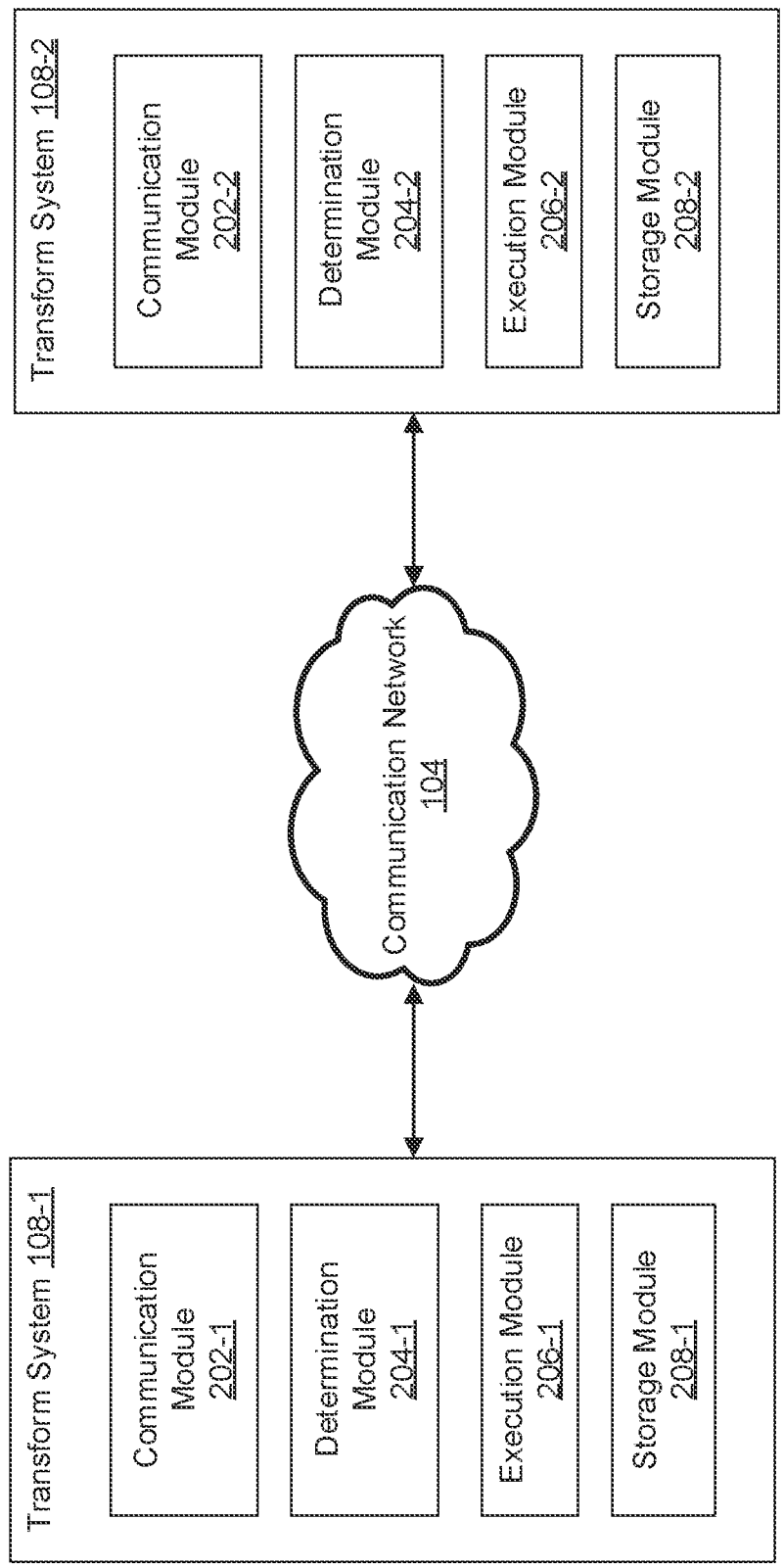
FIG. 2 depicts a diagram of an example of a first replication system (e.g., a single-master replication system) according to some embodiments.

For ease of discussion, the technology disclosed herein shall be explained with reference to peering a single artifact between two different nodes 102-1 and 102-2 within the example system 100 of FIG. 1. Although discussed assuming peering a single artifact, nothing in this disclosure should be interpreted as limiting the scope of the claimed solution to only such an embodiment. A person of ordinary skill in the art would understand that the discussed solution is generally applicable to peering of a greater number of artifacts, and peering between more than two nodes within a system. FIG. 2 depicts an example block diagram of the transform systems 108-1, 108-2 of the nodes 102-1, 102-2, respectively, in accordance with embodiments of the technology disclosed herein.

FIG. 2 depicts a block diagram illustrating components of two transform systems 108-1, 108-2 of the system 100 of FIG. 1. Although not illustrated in FIG. 2, a person of ordinary skill in the art would understand that each transform system 108 is associated with a respective node 102 as shown in FIG. 1. Moreover, a person of ordinary skill in the art would understand that the components shown in FIG. 2 are representative of the components of the other transform systems 108 within the system 100. The modules described in FIG. 2 enable the transform systems 108 to accept, reject, store, and/or execute received operations from client devices and other nodes 102 in the system 100. The transform systems 108-1, 108-2 are shown as including a communication module 202, a determination module 204, a storage module 206, and an execution module 208, all of which are configured to communicate with each other over a bus, a shared memory, a switch, or the like.

Any one or more of the components (e.g., modules) described herein may be implemented using hardware alone (e.g., one or more processors of a machine) or a combination of hardware and software. For example, any component described herein may physically include an arrangement of one or more of the processors or configure a processor (e.g., among one or more processors of a machine) to perform the operations described herein for that module. Accordingly, different components described herein may include and configured different arrangements of the processors at different points in time or a single arrangement of the processors at different points in time. Each component (e.g., module) described herein is an example of a means for performing the operations described herein for that component. Moreover, any two or more of these components may be combined into a single component, and the functions described herein for a single component may be subdivided among multiple components. Furthermore, according to various example embodiments, components described herein as being implemented within a single machine, database, or device may be distributed across multiple machines, databases, or devices.

In various embodiments, the communication module 202-1, 202-2 is configured to receive the one or more operations from the respective clients. In various embodiments, the communication module 202-1, 202-2 can comprise a transmitter, a receiver, an antenna, and/or other hardware or circuitry for communicating over a communications network. In various embodiments, the communication module 202-1, 202-2 can transmit one or more accepted operations to each respective client, which can be executed by the client application of each client to result in a local copy of the artifact maintained by each client that is consistent with a system-wide expected artifact representation as determined in accordance with the consistency process discussed with respect to FIGS. 5 and 6.

In various embodiments, the determination module 204-1, 204-2 is configured to determine how the operations received from the respective clients, and those received from other nodes (through transform systems 108 of other nodes) should be ordered to result in a consistent view of the post-operation artifact. In various embodiments, the determination module 204-1, 204-2 can be configured to resolve conflicts not only between operations received from the clients associated with the node of the respective transform system 108, but also to resolve conflicts between operations received from other nodes in the system 100. The determination may be made based on a total ordering agreed upon by all the nodes 102 in the system 100. In a conventional OT-based network, one of the nodes 102 would be designated as the primary or master node for each artifact, with any other node 102 serving as a secondary node for that artifact. In various embodiments, each secondary node can maintain a local copy of the same artifact in its own artifact database 106, while the master node maintains the true copy of the artifact in its own artifact database 106, and in some embodiments the clients may maintain their own local copy of the artifact. Clients of the master node and the secondary nodes are capable of making edits or changes to the artifact concurrently. At each secondary node, the operations (e.g., changes) received from the secondary node's associated clients can be executed locally on the locally-stored artifact. The received operations are then sent from the secondary nodes to the master node to add the received operations to the true copy maintained by the master node. The master node sorts the operations it receives in the order it receives them, and where conflicts arise, the master node determines how to solve the conflict, either accepting or rejecting received operations. The master node proceeds to transform the accepted operations and sends them back out to the secondary nodes. At the secondary nodes, the transformed operations received from the master node would override the local operations performed by the secondary nodes in the interim.

However, requiring a single primary node has a number of technical drawbacks in terms of supporting high availability and/or disconnected operation. For example, the master node may go offline, causing issues with the conflict resolution ability of the system. Moreover, multiple secondary nodes may want to collaborate but which are disconnected from their master mode (e.g., the multiple secondary nodes are offline), resulting in the multiple secondary nodes not being capable of getting the changes into the one true log. Resolving of conflicts without any node serving as the master node is discussed in greater detail below.

In some embodiments, the execution module 206-1, 206-2 is configured to execute the operations as received from its associated clients from the communication module 202-1, 202-2, respectively, to the local copy of the artifact. In various embodiments, the execution module 206-1, 206-2 can also be configured to execute the operations after the determination module 204-1, 204-2, respectively, determines how to apply the received operations from the clients and from the other nodes in the system 100 based on the total ordering resulting in consistency in the artifact when the accepted operations are applied. In various embodiments, execution of the operations determined according to a total ordering can complete an update of the local copy of the artifact stored in the artifacts database 106 of the node 102.

In various embodiments, the storage modules 208-1, 208-2 can be configured to store the operations determined according to the total ordering and/or an updated artifact after performance of the operations into a database (e.g., the artifacts databases 106-1, 106-2, respectively). In some embodiments, the storage modules 208-1, 208-2 can save the operations determined to be accepted based on the agreed-upon total ordering in a database. The storage module 208-1, 208-2 can be further configured to retrieve the operations and/or the updated version of the artifact from the database at a later time. The communication module 202-1, 202-2 can be configured in various embodiments to transmit the determined operations to the one or more clients associated with the respective node 102 of the transform system 108.

In various embodiments, each node 102 maintains a history of all operations received from its associated clients and from all other nodes 102 in the system 100. For each proposed operation o, every node also keeps causality information summarizing the cause of o, e.g., the set of all proposed operations p such that p happens before o (e.g., p→o). This causality implies that the operation o is dependent on the effect of operation p. To maintain this causality relationship, each node 102 (e.g., by the transform system 108) maintains a vector clock, whose components correspond to the highest-known logical timestamps of each node in the network. As a non-limiting example, assuming only two nodes 102 (as depicted in FIG. 2), each node would maintain a vector clock VC[TS (node 102-1), TS (node 102-2)], with TS (node 102-1) as the logical timestamp for node 102-1 and TS (node 102-2) as the logical timestamp for node 102-2. When a node 102 sends a proposed operation to another node 102, it will also send its vector clock VC corresponding to the artifact state prior to applying the proposed operation locally. Let the vector clock VC attached to a proposed operation o as described above be denoted VC(o). In this case, the cause of a proposed operation o can be equivalently defined as the set of all proposed operations p such that VC(p)<VC(o). Once an operation has been proposed by a node, it is not possible to change the contents of the operation or its vector clock VC(o), resulting in the history at each node 102 growing in an append-only way.

When a node wants to determine the set of proposed operations to send to another node, the sending node compares its vector clock against the vector clock of the destination node. Therefore, to determine the set of proposed operations to send to the second node 102-2, the first node 102-1 would compare its own vector clock VC against the vector clock VC of the second node 102-2. The difference in logical timestamps of each component of the vector clock would specify the range of proposed operations (originating from the node corresponding to the component) that should be transmitted. In other words, the difference in logical timestamps identifies the set of proposed operations that first node 102-1 has but the second node 102-2 does not have.

Figure 3:
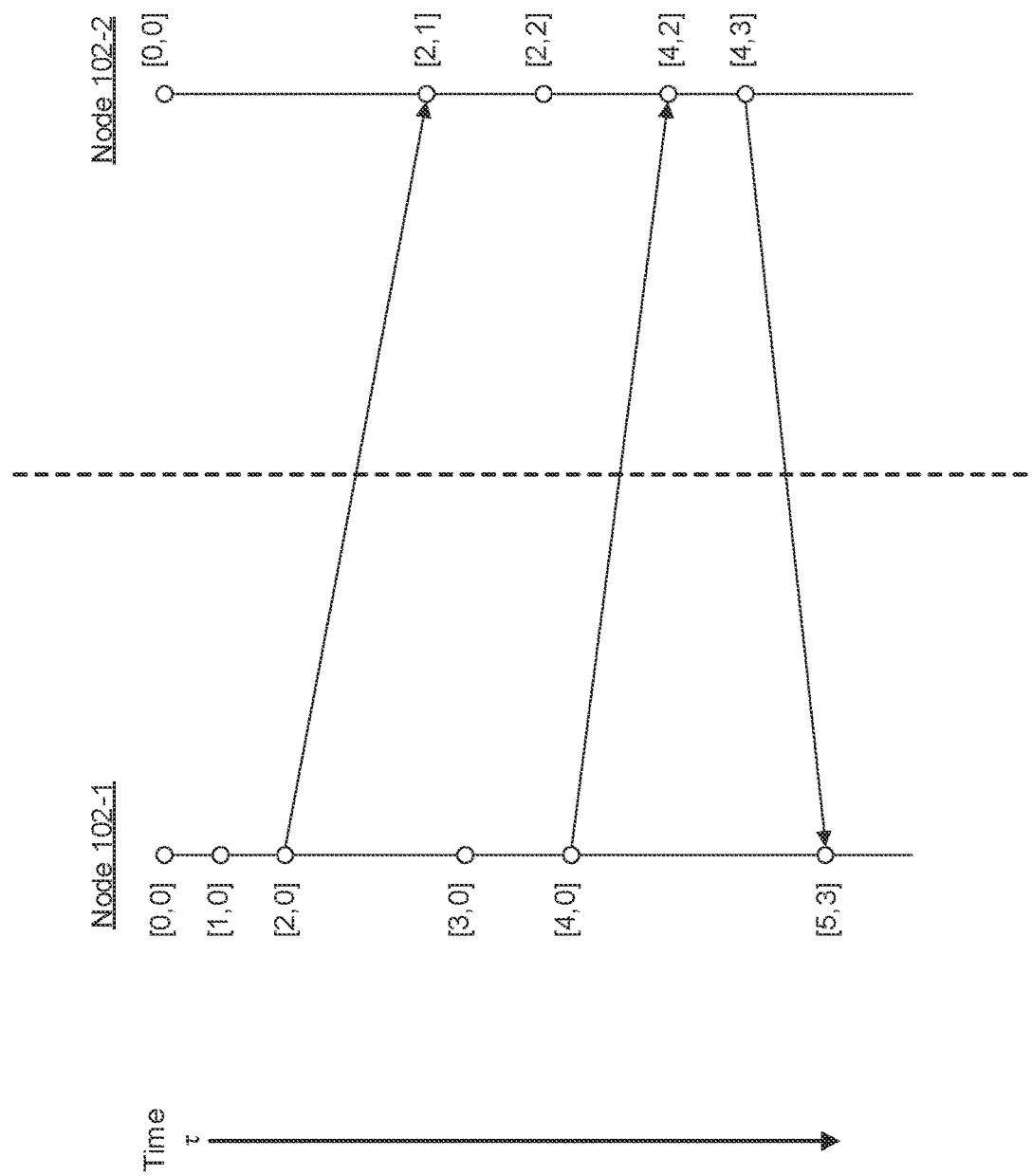
FIG. 3 depicts a diagram of an example of a second replication system (e.g., a multi-master replication system) according to some embodiments.

FIG. 3 depicts an example of operations being peered between two nodes 102-1, 102-2 in accordance with embodiments of the technology disclosed herein. FIG. 3 depicts different proposed operations on each node 102-1, 102-2 over time T. In various embodiments, the initial logical timestamp of each node 102-1, 102-2 may be zero or "null." As shown in FIG. 3, this results in the initial vector clock VC for each node 102-1, 102-2 being [0, 0]. As time T progresses, each node receives proposed operations from one or more of its respective clients, resulting in an increment in its logical timestamp. In FIG. 3, the first node 102-1 receives a first proposed operation resulting in its vector clock VC increasing to [1, 0], and then receives a second proposed operation resulting in a vector clock of [2, 0].

As shown in FIG. 3, the first node 102-1 decides after receiving the second proposed operation to transmit its proposed operations to the second node 102-2. This determination may be made in various embodiments by the communication module 202-1 discussed with respect to FIG. 2, by the determination module 204-1 in some embodiments, or by another component of the first node 102-1 in some embodiments. To determine what proposed operations to send to the second node 102-2, the first node 102-1 compares its vector clock with the vector clock of the second node 102-2. In the illustrated embodiment, because the second node 102-2 has not received any proposed operations from one or more of its clients, it has not sent an updated vector clock to the first node 102-1 (which is sent along with proposed operations). Therefore, the first node 102-1 compares its vector clock (at this point, [2,0]) against the vector clock of second node 102-2 of which the first node 102-1 is aware. Therefore, the component of the vector clocks associated with the first node is compared (here, [2] and [0]) and the component of the vector clocks associated with the second node is compared (here, [0] and [0]). This comparison results in the first node 102-1 determining that it needs to send both the first and second proposed operations to the second node 102-2 because there is a difference between the logical timestamp components associated with the first node (that is, [2]>[0]). In various embodiments, the first node 102-1 can send over the communication network the first and second proposed operations, each accompanied by the first node's vector clock prior to applying the operation.

After sending the first and second proposed operations, the first node 102-1 can change its awareness of the vector clock of the second node 102-2 to reflect the proposed operations that were transmitted. That is, as known to the first node 102-1, the vector clock of the second node 102-2 would be [2,0]. This is also consistent with how the second node 102-2 would update its own clock after receiving the proposed operations. Moreover, without receiving any proposed operations from the second node 102-2, the first node 102-1 can receive another proposed operation at a later time T, resulting in the first node's vector clock changing to [3, 0] because the logical timestamp of the first node 102-1 increments by one.

At the second node 102-2, after receiving the first and second proposed operations from the first node 102-1, the second node 102-2 might receive its first proposed operation from one of its associated clients. Because the first node 102-1 would have sent its vector clock ([2,0]) to the second node 102-2 along with its first and second proposed operations, the second node 102-2 would have updated its vector clock to indicate the highest-known logical timestamp of the first node. Therefore, when it received its first proposed operation, the second node 102-2 can increment its own associated logical timestamp such that the second node's vector clock would become [2,1]. This indicates that the second node 102-2 has received the first and second proposed operations of the first node 102-1 as well as the first proposed operation from its own clients. Because the second node 102-2 has not sent any proposed operations to the first node 102-1, the operation associated with the vector clock [2,1] at the second node 102-2 is determined to be concurrent with the operation associated with the vector clock [3,0] of the first node 102-1. A proposed operation (e.g., operation a) is said to happen concurrently to another proposed operation (e.g., operation b) if and only if neither a→b or b→a. Both nodes 102-1, 102-2 can continue to receive concurrent operations without transmitting operations to each other, resulting in the first node's vector clock incrementing to [4,0] and the second node's vector clock incrementing to [2, 2].

As shown in FIG. 3, another decision is made by the first node 102-1 what set of proposed operations it should transmit to the second node 102-2 after receiving the fourth proposed operation from its own clients. As discussed above, the first node 102-1 updates its awareness of the vector clock associated with the second node 102-2 after sending the first set of proposed operations to [2,0]. Maintaining this history allows the first node 102-1 to ensure that only those proposed operations which had not been transmitted yet are transmitted at the present time T. Here, the difference between the vector clocks would tell the first node 102-1 that it needs to transmit the third and fourth proposed operations it received from its own clients, and performing the updating in a manner similar to that discussed above with respect to the first transmission.

Upon receiving the second set of proposed operations from the first node 102-1, the second node 102-2 would update its vector clock to [4,2] to reflect that it has received all four of the proposed operations sent from the first node 102-1. As shown in FIG. 3, a conflict may arise due to the fact that concurrent operations exist at the time of transmitting the second set of proposed operations to the second node 102-2. Therefore, the second node 102-2 may make a determination about how to resolve the conflict such that the operations, when performed, will result in the artifact being in a state consistent with the agreed-upon total ordering of the system 100. The conflict resolution shall be discussed in greater detail with respect to FIGS. 4A-7.

Although vector clocks can provide a partial ordering of operations, vector clocks alone cannot ensure that, when all the known operations are performed by a node 102, that the resulting state of the artifact would be consistent at all nodes 102. To ensure consistency, an agreed upon total ordering is employed in various embodiments of the technology disclosed herein so that each node is capable of ensuring that operations are performed in the proper order. A "total ordering" is an agreed upon a priori order of all possible operations that subsumes/never violates the partial ordering. All of the nodes 102 in the system must use the total ordering to apply their operations, ensuring some consistency in the application of operations. Using the total ordering, as long as the nodes have received the same set of proposed operations, each of such nodes would agree upon the final state of the artifact.

Assuming that operation a is a proposed operation from the first node 102-1 and operations b is a proposed operation from the second node 102-2, then the total ordering in various embodiments may dictate that a happens before b if and only if 1) |VC(a)|<|VC(b)| or 2) |VC(a)|=|VC(b)| and x<y, where |·| denotes the sum of components of the vector clock for each node 102-1, 102-2 and wherein x, and y represent the external identifications of the node associated with operation a and the node associated with the operation b, respectively. In other embodiments, the total ordering may be designed to preserve the physical time-based temporal order. For example, the total ordering may take into account the physical timestamp through performance of a topological sort, wherein ties are broken based on the physical timestamp. Another potential total ordering approach can comprise predefining a preference for the nodes within the system 100 and using the preference to break any ties (e.g., to determine which concurrent operations to accept when a conflict arises).

To recreate the artifact state at a given node, all of the proposed operations in the node's history must be applied according to the total ordering. When a proposed operation o is applied, it needs to be converted into an applied operation O. In some instances, this conversion may involve running an operational transform over the proposed operation o in order to resolve conflicts between other applied operations that occurred concurrent to operation o. In various embodiments, this results in a log of applied operations $O_1$, $O_2$, etc., which correspond to the ordered proposed operations $o_1$, $o_2$, etc. The operational transform P for a proposed operation can be defined as $$T([A_1, A_2, \ldots], [e_1, e_2, \ldots], p) = P \quad (1)$$

where $[A_1, A_2, \ldots]$ represents a sequence of applied operations whose corresponding proposed operations are $a_1$, $a_2$, etc., p represents an operation which is to be transformed into an applied operation P, and $[e_1, e_2, \ldots]$ represents an exclusion vector of booleans, with one entry per applied operation Ai. With respect to the exclusion vector, $e_i$ can be set to false if and only if $a_i$ happened concurrent top, where $a_i$ is the proposed operation that corresponds to $A_i$. Equivalently, $e_i$ can be set to true if and only if operation $a_i$ happens before p. Under the traditional OT-based peering approach, it was assumed that all applied operations $A_i$ from the sequence of applied operations were concurrent with the proposed operation being transformed p. However, in the "master-to-master" architecture depicted in FIG. 1, this assumption no longer applies so the operational transform must be able to exclude the effects of operations whose effects were already taken into account by the proposed operation p. In various embodiments, the exclusion vector can be implicitly passed to the transform function through the vector clocks attached to the input operations. This is possible because the transform function can determine the set of dependent versus concurrent operations based on the vector clocks, in a manner similar to that discussed above.

When a new proposed operation p is to be applied to a current log of applied operations $A_1$, $A_2$, ..., $A_n$, in various embodiments the smallest (e.g., earliest) k is determined such that $a_k$ happened concurrently to operation p. Where no such k exists, k can be treated as k=∞. After determining k, the node can apply operation P where:

$$T([A_k, \ldots, A_n], [e_k, \ldots, e_n], p) = P \quad (2)$$

Where k=∞, the sequence of applied operations $[A_k, \ldots, A_n]$ can be defined as an empty list, in which case the transform operation T behaves equivalently to the identity function and P=p.

In various embodiments, the conflict resolution may be performed without an exclusion vector as discussed above. Given n totally ordered operations $[o_1, o_2, \ldots, o_n]$, for each operation the operation $o_i$ can be transformed across all previous operations that are not happens before (e.g., $VC(o_k) < VC(o_i)$). Therefore:

$$T([\forall o_k \text{ such that } k < i^- VC(o_k) \leq VC(o_i)], o_i) \quad (3)$$

In various embodiments, for runs of adjacent operations that increment a single entry of the vector clock, the list of operations to transform across is the same. This means that batches of "happens after" operations from a single node can be transformed and applied together. In other words, where the vector clock being sent with proposed operations are only "happens after," than the proposed operations could be cached and processed together.

As discussed previously, current systems are capable of performing conflict resolution if a single node is determined to be the "master" for an artifact. In the conventional system, each node would maintain a local log, defining the operations that would need to be performed locally by a client operation to arrive at the desired artifact state. The desired artifact state would represent the state of the artifact after all of the operations are applied as determined by the master node. Therefore, each node and/or client would have a local log containing only the operations that need to be performed in order to arrive at the desired artifact. In the "master-to-master" architecture discussed herein, this is insufficient to ensure that the desired artifact is obtained because no node is receiving an authoritative log of the transformed operations to be performed (e.g., a master node is not identifying the accepted operations to be applied by all clients).

In various embodiments, each node 102-1 of the master-to-master architecture of FIG. 1 can maintain a separate shadow log different from the local log. Wherein the local log contains a linear set of operations to be applied by a client application to arrive at the artifact state according to the total ordering, the shadow log is a graphical list of all proposed operations received from the respective clients and the other nodes in the system. Whereas only the master node maintains the "true log" in the conventional approach, every node in the master-to-master architecture of FIG. 1 maintains its own "true log" in the form of the shadow log.

Figure 4A:
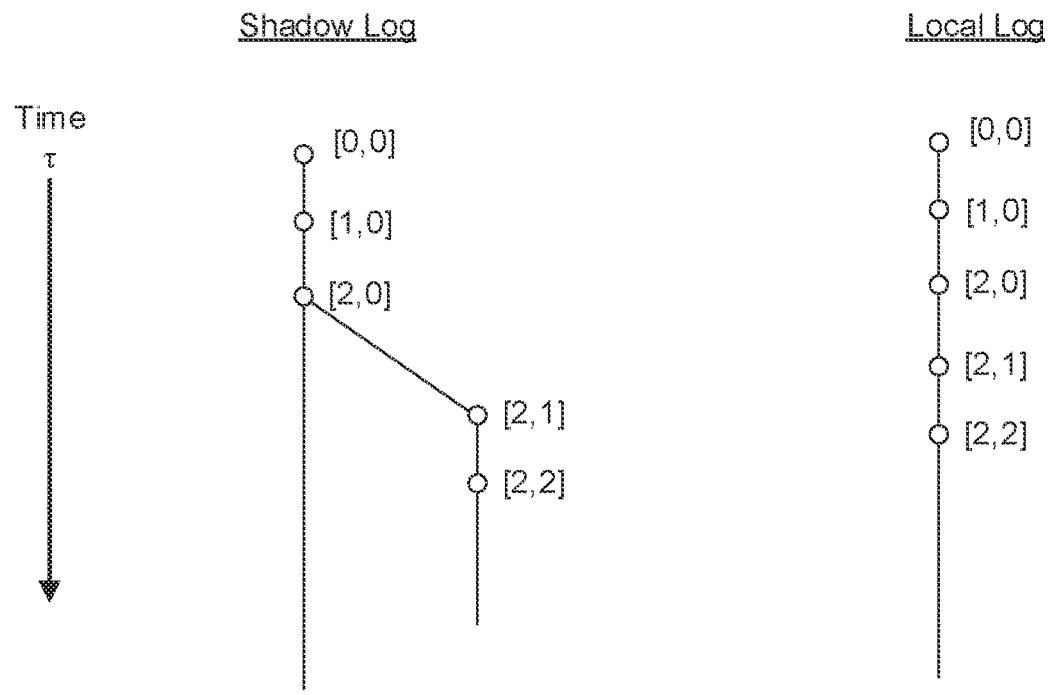
FIG. 4A and FIG. 4B each depict a diagram of an example of a method for adaptive data replication according to some embodiments.
Figure 4B:
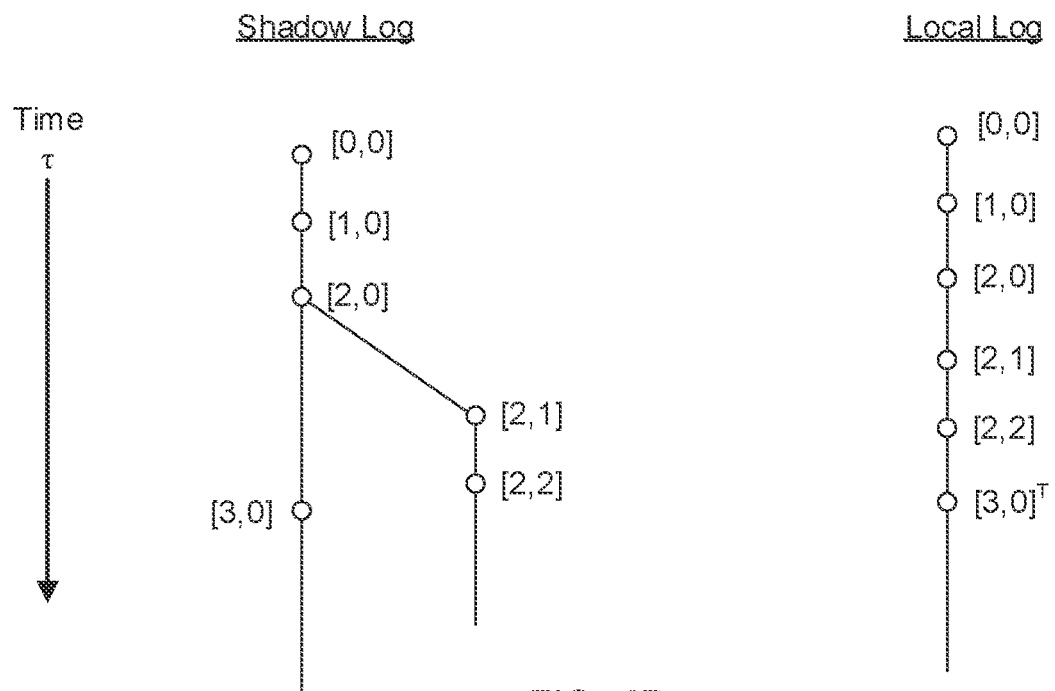

FIGS. 4A and 4B depict how conflicts and operations are handled in the master-to-master architecture of FIG. 1 in accordance with embodiments of the technology disclosed herein. As shown in FIG. 4A, the shadow log at the second node 102-1 may include the proposed operations received from the first node 102-1 as discussed with respect to FIG. 3, as well as the proposed operations received from the clients of second node 102-2. In various embodiments, the transform system 108-2 of the second node 102-2 can determine the local log, showing that each proposed operation can be performed in a linear fashion because no conflicts exist amongst the operations at this time. Therefore, the client applications can receive the local log in order to know how to generate the proper representation of the artifact. However, when the third proposed operation from the first node 102-1 is synced/transmitted to the second node 102-2 as shown in FIG. 4B, the shadow log may include a branch to represent the concurrent nature of the operation associated with vector clock [3,0]. Based on the shadow log, the transform system 108-2 may insert the effect of the third proposed operation from the first node 102-1 in between the operation [2,0] and operation [2,1] of the local log. However, because the local log may already have been provided to the client applications, inserting the required operation into the middle of the local log may cause issues with the client application. If the client application already applied the operations [2,1] and [2,2], the transform system 108 may be unable to slot the newly received concurrent operation into the correct spot on the linear local log. Rather, the transform system 108 may append a transformed version (e.g., $[3, 0]^T$) to the end of the local log, with the transform system 108 determining the required operational transform to insert correctly the newly received operation into the linear local log. That is, the local log is an append-only log, and OT clients subscribe to the local log (not the shadow log), ensuring that the clients do not have to address operation replay or the reordering of operations within history. Therefore, unlike conventional approaches, each node 102 is capable of independently determining how to obtain the desired artifact state, rather than receiving an authoritative set of operations to obtain the state that may result in the need to redo the work locally.

As shown in FIGS. 4A and 4B, both the shadow log and the local log at each node have a vector clock associated with them. When the vector clock for the local log becomes less than the vector clock of the shadow log (e.g., when the node receives a proposed operation from another node), the receiving node will apply a sync operation to the local log. In various embodiments, the sync operation can take the artifact state of the shadow history (representing the "authoritative" view of the peered artifact) and computes a transformed operation against the artifact state of the local log. This operation is applied to the local log, after which the local log's vector clock is set to the same as the shadow history's vector clock.

When a node (e.g., the first node 102-1, the second node 102-2) receives a proposed operation from one of its associated clients, the node 102 applies the proposed operation locally before looking to the shadow log. When a client proposed an operation $o_c$, the associated node transforms the operation into the applied operation $O_c$ (transformed against the local history) and applies the applied operation $O_c$ to the local log. After applying $O_c$ to the local log, the applied operation O, is proposed to the shadow log as a new proposed operation $o_s$, with an associated vector clock equal to the vector clock of the local log prior to the operation $O_c$ being applied to the local log. In various embodiments, where no concurrent operations exist, the operation $o_s$ will be applied cleanly to the shadow log (e.g., no transformation) by simply incrementing the vector clock on the shadow log to match the vector clock on the local log. Where concurrent operations do exist (such as the example depicted in FIG. 4B), the operation $o_s$ is transformed and the local log would need to catch up later via the sync operation between the shadow and local logs (as discussed with respect to FIGS. 4A and 4B).

FIG. 5 depicts a flowchart 500 of an example method for determining a set of proposed operations to send to a second node in a master-to-master architecture according to some embodiments. The example method illustrated in FIG. 5 can comprise instructions executable by a processor to cause the processor to perform the functions described, the instructions being stored on a non-transitory computer readable medium.

At operation 502, a first node can receive a local set of proposed operations from one or more clients associated with the first node. The local set of proposed operations may be related to a shared artifact that is being shared between the first node and the second node in a collaborative work environment.

At operation 504, the first node can determine a subset of the local set of proposed operations received from the one or more clients that are to be sent to the second node. In various embodiments, determining the subset of locally-proposed operations to send to the second node can be determined based on vector clocks associated with the receipt of each proposed operation. In some embodiments, the determination may be performed by comparing the vector clocks to identify a difference between the logical timestamp components of the vector clocks as discussed above.

At operation 506, the first node can transmit the subset of proposed operations to the second node. In various embodiments, the subset of locally-proposed operations can include all of the proposed operations received locally from the one or more clients, while in other embodiments the subset may include less than all of the receive proposed operations because the difference in the vector clocks indicates that some of the received proposed operations were already transmitted to the second node. In various embodiments, transmitting the subset of proposed operations includes sending an associated vector clock for each proposed operation, the associated vector clock identifying the state of the artifact prior to the associated proposed operation being applied to the local log.

At operation 508, the first node can increment its copy of the vector clock associated with the second node to reflect all the proposed operations sent to the second node. As discussed above, each node maintains a copy of the vector clock for each other node such that a given node can determine whether there are proposed operations from its associated clients that has yet to be peered with the other nodes. Incrementing the vector clock comprises identifying the local copy of a vector clock associated with the second node and increasing the logical timestamp corresponding to the first node to represent the highest-known logical timestamp (e.g., the highest-numbered operation of the first node's clients transmitted to the second node).

Figure 6:
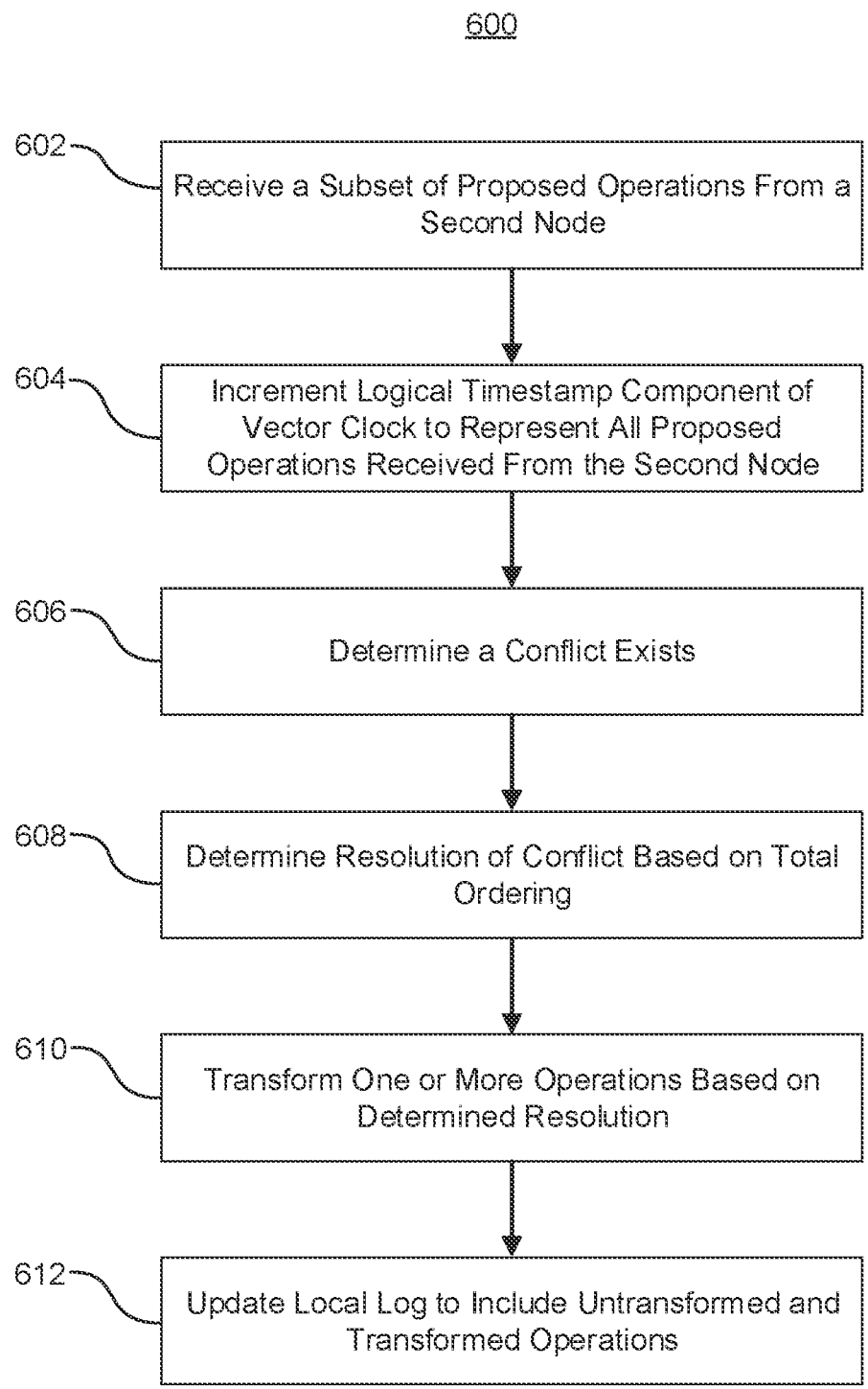
FIG. 6 depicts a flowchart of an example of a method for performing a second replication mode (e.g., a multi-master replication mode) according to some embodiments.

FIG. 6 depicts a flowchart 600 of an example method for determining an order of operations to achieve a desired artifact state in a master-to-master architecture according to some embodiments. The example method illustrated in FIG. 6 can comprise instructions executable by a processor to cause the processor to perform the functions described, the instructions being stored on a non-transitory computer readable medium.

At operation 602, the first node can receive a subset of remote proposed operations from a second node. In various embodiments, the subset of remote proposed operations may have been determined in a manner similar to that discussed with respect to FIG. 5. The subset of proposed operations may be received over a communication network (such as communication network 104 discussed with respect to FIG. 1), and in some embodiments the subset of proposed operations may be received by a communication module of a transform system of the first node (similar to that discussed above with respect to FIG. 2). In various embodiments, the first node may also receive one or more locally-proposed operations from its own clients concerning the artifact being peered.

At operation 604, the first node may increment a logical timestamp component of its associated vector clock to represent all of the proposed operations received from the second node. In various embodiments, the component may be incremented in a manner similar to that discussed above with respect to the vector clocks. In some embodiments, operation 604 may further include incrementing a logical timestamp corresponding to the first node in a local copy of a vector clock associated with the second node for use in ensuring that operations being peered between nodes are not missed.

At operation 606, the first node can determine whether a conflict exists. In various embodiments, a conflict exists where one or more concurrent operations exist between the proposed operations already known to the first node and those received from the second node. Operations may be considered concurrent as discussed above.

At operation 608, the first node can determine a resolution to the determined conflicts based on the total ordering. The total ordering defines how every node within the system is to resolve conflicts such that, for all nodes that are aware of the same total set of proposed operations, the resulting local version of the artifact is in the same state. In some embodiments, the total ordering may comprise one of the proposed total ordering approaches discussed above. The conflict resolution may be performed in a manner similar to that discussed above.

At operation 610, the first node can transform one or more operations. As discussed above with respect to FIGS. 4A and 4B, in some embodiments the first node may need to transform one or more of the received proposed operations (as determined by the total ordering) into a transformed operation that, when applied to the local log of the first node, results in an artifact state consistent with the state had the transformed operation been applied in the proper linear time.

At operation 612, the first node can update the local log to include the untransformed and transformed operations. As discussed above with respect to FIGS. 4A and 4B, the nodes may be configured to determine whether the received proposed operation would need to be transformed to account for concurrent operations that were already applied to the local log.

Hardware Implementation

Figure 7:
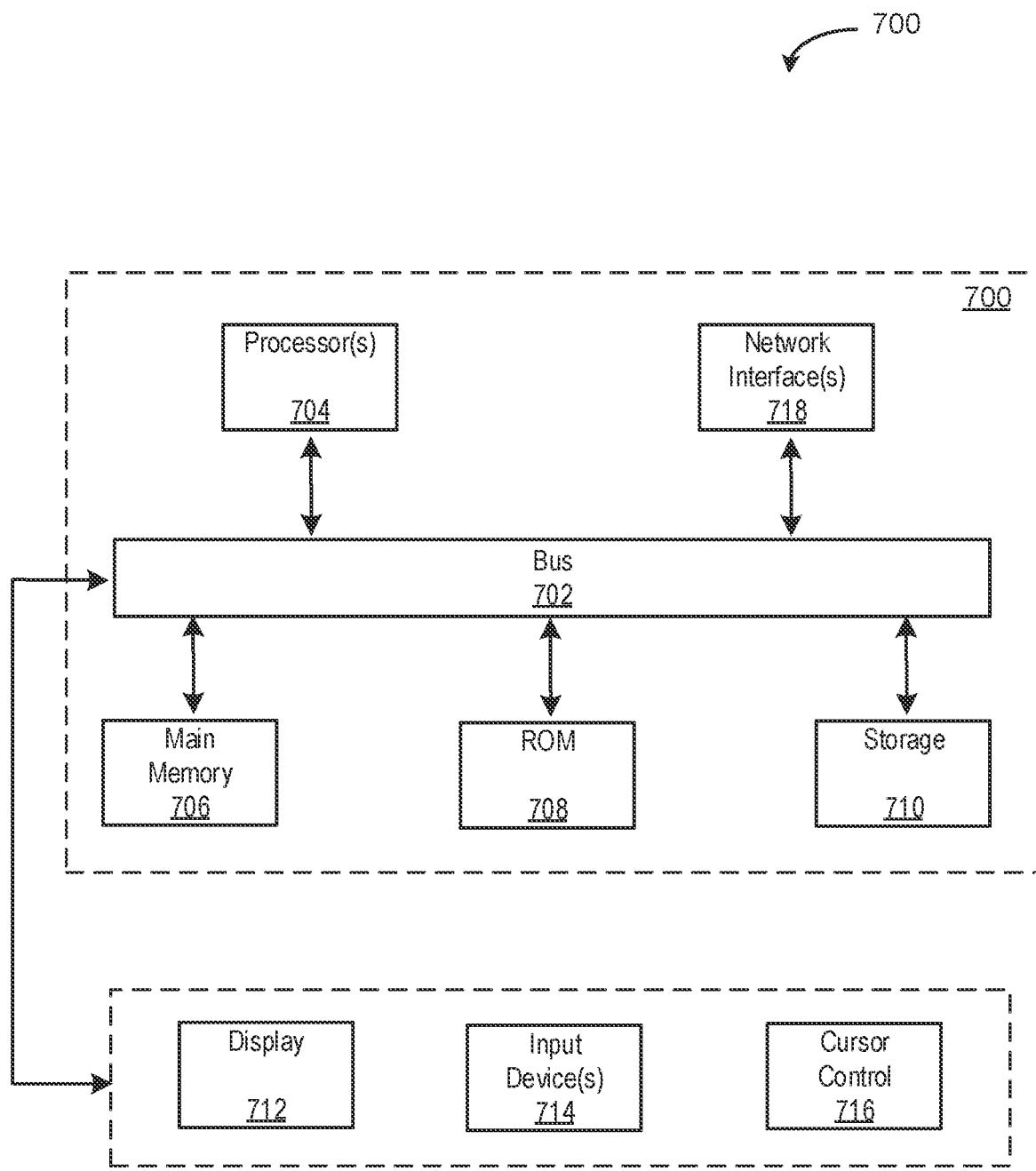
FIG. 7 depicts a block diagram of an example of a computer system upon which any of the embodiments described herein may be implemented.

FIG. 7 depicts a block diagram of an example of a computer system 700 upon which any of the embodiments described herein may be implemented. The computer system 700 includes a bus 702 or other communication mechanism for communicating information, one or more hardware processors 704 coupled with bus 702 for processing information. Hardware processor(s) 704 may be, for example, one or more general purpose microprocessors.

The computer system 700 also includes a main memory 706, such as a random access memory (RAM), cache and/or other dynamic storage devices, coupled to bus 702 for storing information and instructions to be executed by processor 704. Main memory 706 also may be used for storing temporary variables or other intermediate information during execution of instructions to be executed by processor 704. Such instructions, when stored in storage media accessible to processor 704, render computer system 700 into a special-purpose machine that is customized to perform the operations specified in the instructions.

The computer system 700 further includes a read only memory (ROM) 708 or other static storage device coupled to bus 702 for storing static information and instructions for processor 704. A storage device 710, such as a magnetic disk, optical disk, or USB thumb drive (Flash drive), etc., is provided and coupled to bus 702 for storing information and instructions.

The computer system 700 may be coupled via bus 702 to a display 712, such as a cathode ray tube (CRT) or LCD display (or touch screen), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 700 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor(s) 704 executing one or more sequences of one or more instructions contained in main memory 706. Such instructions may be read into main memory 706 from another storage medium, such as storage device 710. Execution of the sequences of instructions contained in main memory 706 causes processor(s) 704 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 710. Volatile media includes dynamic memory, such as main memory 706. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may retrieves and executes the instructions. The instructions received by main memory 706 may optionally be stored on storage device 710 either before or after execution by processor 704.

The computer system 700 also includes a communication interface 718 coupled to bus 702. Communication interface 718 provides a two-way data communication coupling to one or more network links that are connected to one or more local networks. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN (or WAN component to communicated with a WAN). Wireless links may also be implemented. In any such implementation, communication interface 718 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 718, which carry the digital data to and from computer system 700, are example forms of transmission media.

The computer system 700 can send messages and receive data, including program code, through the network(s), network link and communication interface 718. In the Internet example, a server might transmit a requested code for an application program through the Internet, the ISP, the local network and the communication interface 718.

The received code may be executed by processor 704 as it is received, and/or stored in storage device 710, or other non-volatile storage for later execution.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "datastore," and/or "database" may comprise software, hardware, firmware, and/or circuitry. In one example, one or more software programs comprising instructions capable of being executable by a processor may perform one or more of the functions of the engines, datastores, databases, or systems described herein. In another example, circuitry may perform the same or similar functions. Alternative embodiments may comprise more, less, or functionally equivalent engines, systems, datastores, or databases, and still be within the scope of present embodiments. For example, the functionality of the various systems, engines, datastores, and/or databases may be combined or divided differently.

The datastores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

The invention claimed is:

1. A system for artifact peering, comprising:
a first node storing a local log and a shadow log, wherein the local log stores a set of operations to be applied to an artifact, and the shadow log stores operations proposed from one or more different nodes, each branch of the shadow log storing operations from a particular client or a particular node;
wherein the first node comprises one or more processors and a memory storing instructions that, when executed by the one or more processors, cause the processors to:
maintain a local vector clock associated with the first node and a copy of a vector clock associated with a second node communicatively coupled to the first node;
receive a local proposed operation from the first node;
receive a remote proposed operation to the artifact from the second node;
determine a concurrency between the local proposed operation and the remote proposed operation;
add the local proposed operation to the local log;
add the remote proposed operation to a branch of the shadow log to represent the concurrency;
perform the local proposed operation;
perform a transformed version of the remote proposed operation in response to performing the local proposed operation; and
append the transformed version of the remote proposed operation to the local log following the local proposed operation.

2. The system of claim 1, wherein the instructions, when executed by the one or more processors, further causes the processors to:
increment a logical timestamp associated with the first node for each local proposed operation;
increment a logical timestamp associated with the second node for each remote proposed operation, and
in response to determining that a vector clock associated with the first node is less than a vector clock associated with the second node, determining the transformed version of the remote proposed operation.

3. The system of claim 1, wherein the local log comprises a first local log, and the remote proposed operation originates from a third node and was maintained in a second local log of the second node with respect to remote proposed operations originating from the second node or the first node.

4. The system of claim 3, wherein the remote proposed operation is reflected at a third local log of the third node and was maintained in a third local log of the third node with respect to remote proposed operations originating from the second node or the first node.

5. The system of claim 1, wherein the transformed version is based on respective physical timestamps associated with the remote proposed operation and the local proposed operation.

6. A method comprising:
- maintaining a local vector clock associated with a first node and a copy of a vector clock associated with a second node communicatively coupled to the first node;
- receiving a local proposed operation from the first node;
- receiving, from the second node, a remote proposed operation to the artifact to which a set of operations are applied;
- determining a concurrency between the local proposed operation and the remote proposed operation;
- adding the local proposed operation to a local log stored within the first node;
- adding the remote proposed operation to a branch of a shadow log stored by the first node to represent the concurrency;
- performing the local proposed operation;
- performing a transformed version of the remote proposed operation in response to performing the local proposed operation; and
- appending the transformed version of the remote proposed operation to the local log following the local proposed operation.

7. The method of claim 6, further comprising:
- incrementing a logical timestamp associated with the first node for each local proposed operation;
- incrementing a logical timestamp associated with the second node for each remote proposed operation, and
- in response to determining that a vector clock associated with the first node is less than a vector clock associated with the second node, determining the transformed version of the remote proposed operation.

8. The method of claim 6, wherein the local log comprises a first local log, and the remote proposed operation originates from a third node and was maintained in a second local log of the second node with respect to remote proposed operations originating from the second node or the first node.

9. The method of claim 8, wherein the remote proposed operation is reflected at a third local log of the third node and was maintained in a third local log of the third node with respect to remote proposed operations originating from the second node or the first node.

10. The method of claim 6, wherein the transformed version is based on respective physical timestamps associated with the remote proposed operation and the local proposed operation.

11. A non-transitory computer readable medium comprising instructions that, when executed, cause one or more processors to perform:
- maintaining a local vector clock associated with a first node and a copy of a vector clock associated with a second node communicatively coupled to the first node;
- receiving a local proposed operation from the first node;
- receiving, from the second node, a remote proposed operation to the artifact to which a set of operations are applied;
- determining a concurrency between the local proposed operation and the remote proposed operation;
- adding the local proposed operation to a local log stored within the first node;
- adding the remote proposed operation to a branch of a shadow log stored by the first node to represent the concurrency;
- performing the local proposed operation;
- performing a transformed version of the remote proposed operation in response to performing the local proposed operation; and
- appending the transformed version of the remote proposed operation to the local log following the local proposed operation.

12. The non-transitory computer readable medium of claim 11, wherein the instructions further cause the one or more processors to perform:
- incrementing a logical timestamp associated with the first node for each local proposed operation;
- incrementing a logical timestamp associated with the second node for each remote proposed operation, and
- in response to determining that a vector clock associated with the first node is less than a vector clock associated with the second node, determining the transformed version of the remote proposed operation.

13. The non-transitory computer readable medium of claim 11, wherein the local log comprises a first local log, and the remote proposed operation originates from a third node and was maintained in a second local log of the second node with respect to remote proposed operations originating from the second node or the first node.

14. The non-transitory computer readable medium of claim 13, wherein the remote proposed operation is reflected at a third local log of the third node and was maintained in a third local log of the third node with respect to remote proposed operations originating from the second node or the first node.

* * * * *